Dec. 25, 1928.  
C. J. PAULSON  
1,696,447  
DELIVERY APPARATUS  
Filed Sept. 3, 1926  
3 Sheets-Sheet 1
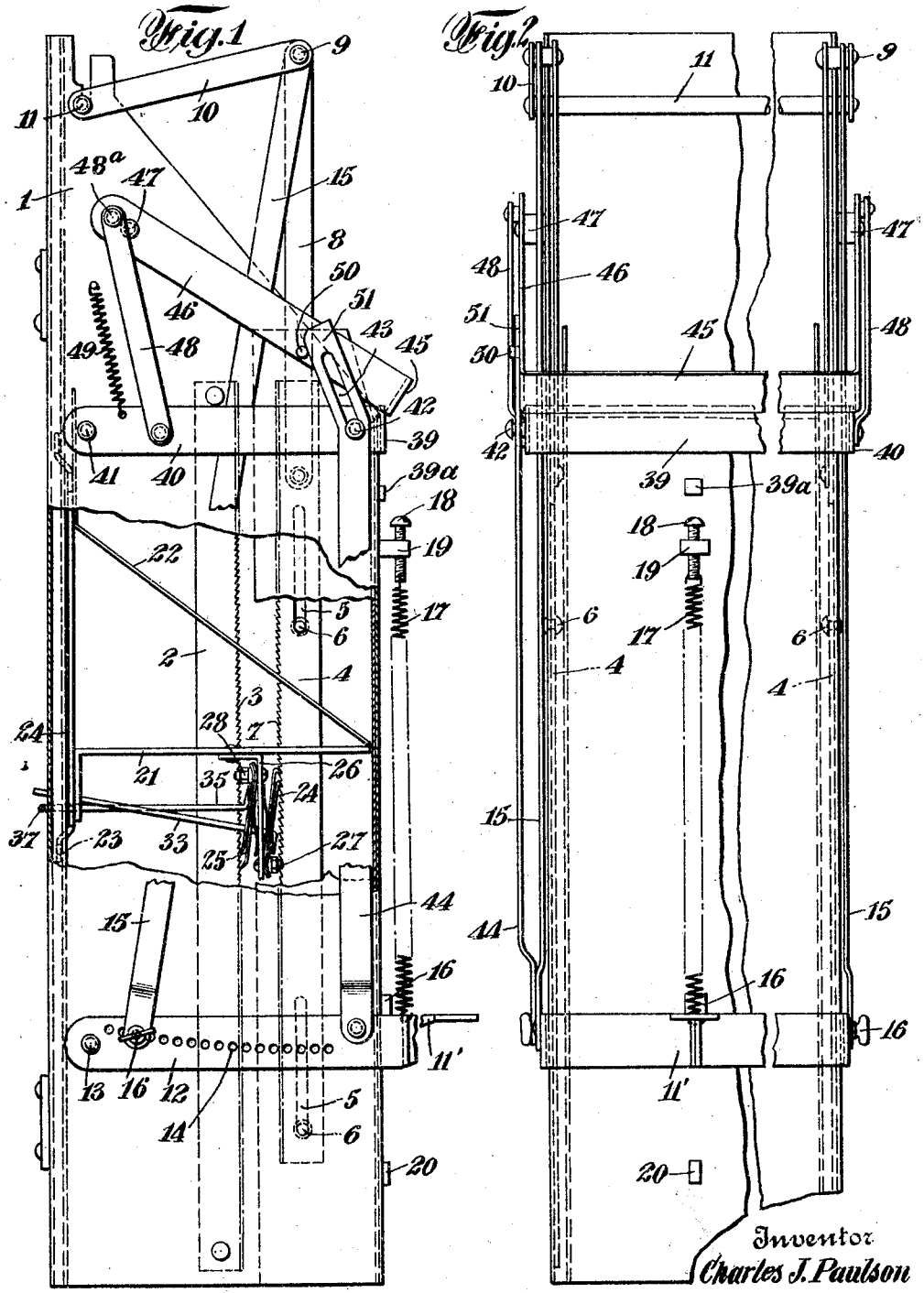
Inventor  
Charles J. Paulson  
By his Attorney  
Frederick W. Barker

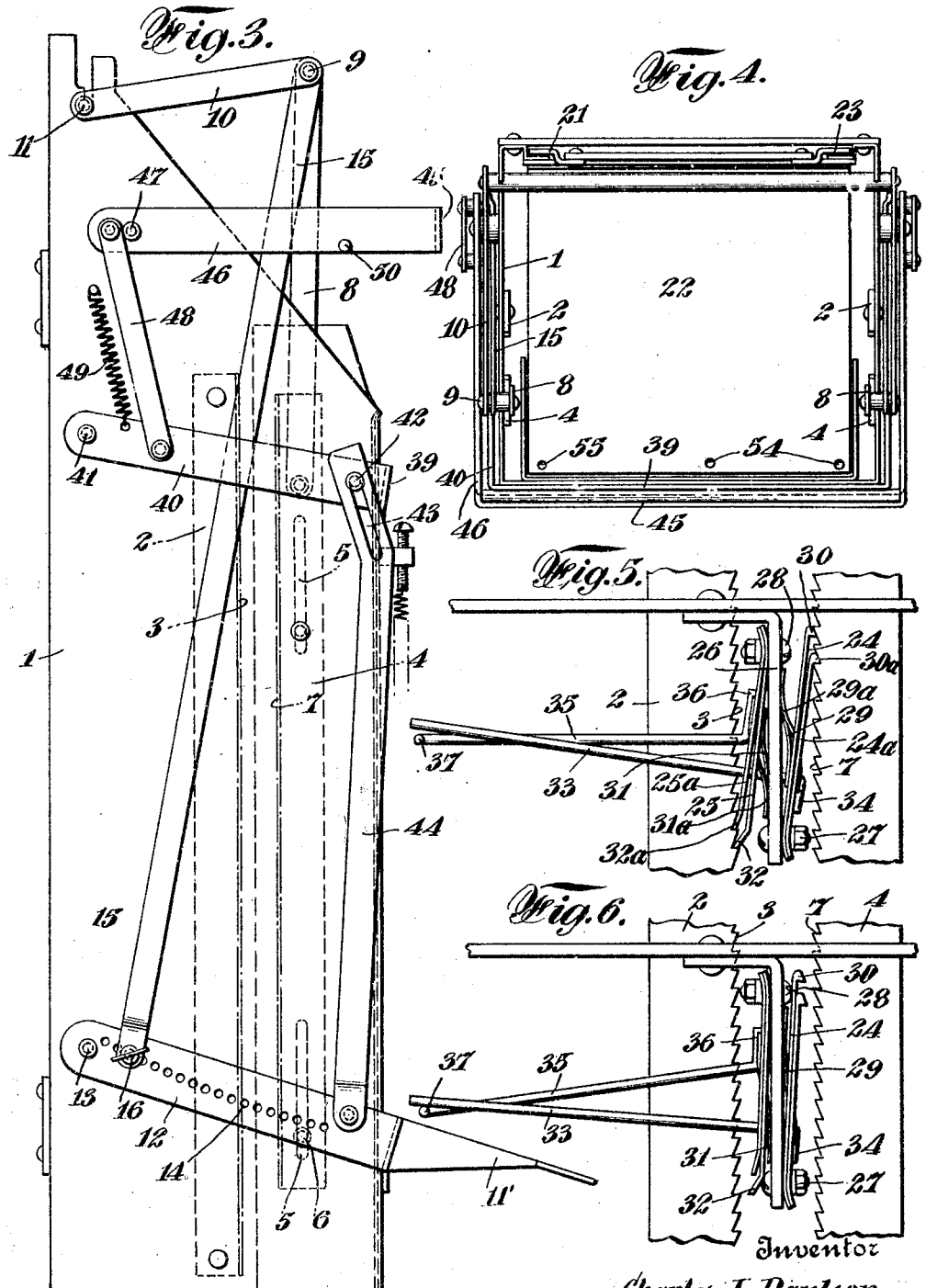

Dec. 25, 1928.
C. J. PAULSON
1,696,447
DELIVERY APPARATUS
Filed Sept. 3, 1926   3 Sheets-Sheet 3
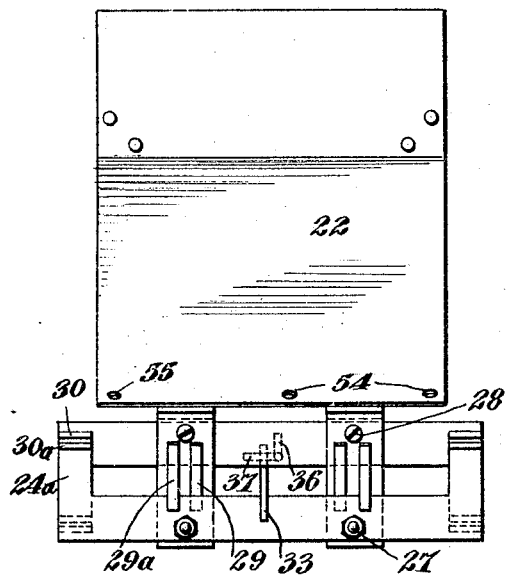
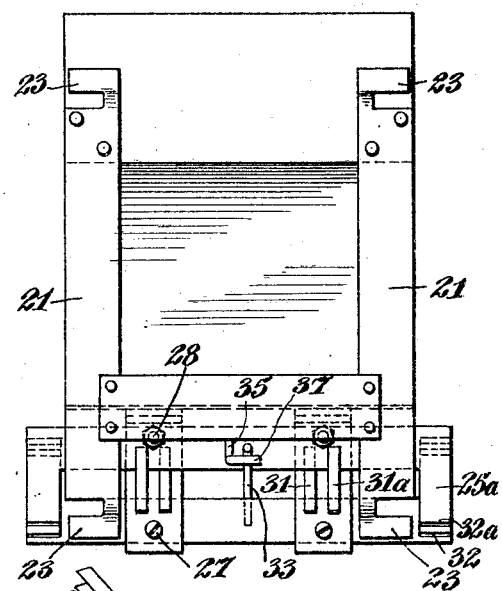
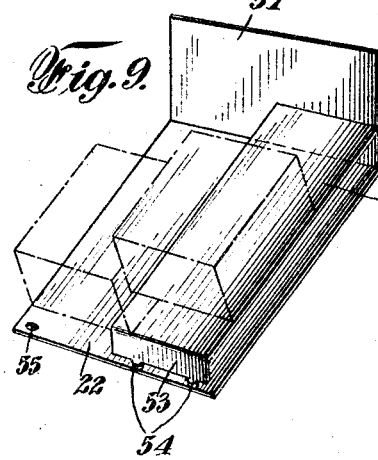
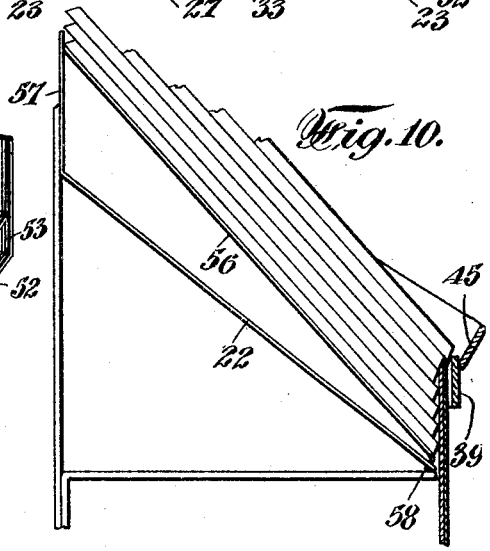
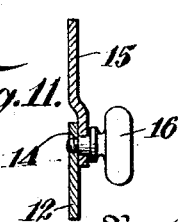
Inventor
Charles J. Paulson
By his Attorney
Frederick W. Barker Patented Dec. 25, 1928.

1,696,447

UNITED STATES PATENT OFFICE.

CHARLES J. PAULSON, OF BROOKLYN, NEW YORK.

DELIVERY APPARATUS.

Application filed September 3, 1926. Serial No. 133,475.

This invention relates to article delivery mechanism for use in vending machines and my improvements are directed especially to means whereby delivery is made from the top of a stack of articles, instead of from the bottom thereof according to the practice generally in vogue.

Experience has shown me that where articles and packages of goods are dispensed mechanically from stacks thereof contained in magazines the friction resulting in forcing an article or package of goods out from the bottom of the stack has the tendency to mar or abrade the article or to tear the wrapping of the package during such delivery. Also I have found the mechanical means employed in dislodging a bottom article or package to be more or less complicated and liable to get out of order.

Therefore the purpose of my present invention is to provide simply devised mechanism adapted for the release of articles or packages from the top of a stack thereof, so that delivery of such articles or packages may be freely effected by gravity or other ejection means, without frictional retardation due to the weight of superimposed articles or packages.

An important feature of my invention consists of a vertically movable carriage for the stack of articles or packages which is movable upwardly a predetermined step of any desired extent with every delivery operation, to bring the next upper article or package into position for its subsequent delivery.

Further my invention involves the use of a key lever which is depressible to operate the delivery mechanism, linkage for actuating the article or package release mechanism, and means of adjustment between the key lever and linkage to regulate the degree of lift to be imparted to the carriage, in order that thereby the machine may be readily accommodated for the delivery of articles or packages of varying thicknesses.

Still further my inveniton includes the provision of means, accessorial to the carriage top, for (1) enabling the alternating delivery of objects disposed in side by side stacks; (2) enabling the simultaneous delivery of a pair of objects when the members of the pair have different thickness and are disposed in side by side stacks; (3) enabling the delivery of articles or packages of a length greater than that provided for by the carriage top per se.

Other features and advantages of my invention will hereinafter appear.

In the drawings:—

Figure 1 is a side elevation of the delivery mechanism, partly broken away to show the lifting carriage.

Fig. 2 is a front elevation of Fig. 1.

Fig. 3 is a similar view to that of Fig. 1, with the key lever depressed.

Fig. 4 is a top plan view.

Fig. 5 is a fragmentary detail view of the ratchet mechanism, in its engaged position.

Fig. 6 is a similar view to that of Fig. 5, with the ratchet mechanism open for release of the carriage.

Fig. 7 is a front view of the carriage.

Fig. 8 is a rear view thereof.

Fig. 9 is a perspective, fragmentary view showing the alternate slide device.

Fig. 10 is a fragmentary side elevation of the plate used when dispensing objects of unusual length, and Fig. 11 is a detail of the throw adjusting pin.

In said views let 1 indicate a hollow frame, here shown as composed of sheet material, rectangular in form, with front, rear and sides. This frame, with its associated and contained mechanisms, is intended to constitute a complete magazine and delivery unit for use in conjunction with a vending machine, and as such it may be enclosed in any suitable casing, either alone or together with other like units.

Secured to the frame 1, near each side thereof, is a vertical bar 2, each of these bars having its forward edge provided with teeth 3. These bars 2 will hereinafter be referred to as the stationary racks. Also located near the side walls of the frame are other vertical bars 4, these bars being provided with guide slots 5 that engage studs 6 secured to the frame, so that bars 4 may be movable vertically within the compass of slots 5.

These bars 4 are provided with teeth 7 on their edges opposed to the teeth 3 and will be referred to hereinafter as the movable racks.

The stationary and movable racks are in spaced, parallel relation in order that an elevator or carriage, provided with certain gripping mechanism, all to be hereinafter described, may releasably engage said racks and be movable vertically in the performance of its functions.

The movable racks 4 are each shown as provided with an upward extension 8, which extensions engage by a pivot 9 with parallel bars 10, that are in connection, respectively with the side walls of the frame as by pivot 11.

A key lever 11', extended forwardly from the frame, continues rearwardly in the form of a yoke, having the arms 12 that are pivoted, at 13, to the sides of the frame, near the lower end thereof. The yoke arms 12 each have a series of transverse holes 14 therethrough, arranged in like arcs struck from the pivot 9 as a centre, and links 15, suspended from pivot 9, are provided at their lower ends with pins or studs 16 adapted to engage in opposed holes 14 in the arms 12. Key lever 11' is shown at rest in its normal position in Fig. 1, a stop 16 upon the frame limiting its upward movement, and thereby determining said normal position against the tension of a return spring 17. Said spring 17 is shown as engaged at one end with the key lever and at its other end with an adjustment screw 18 that is threaded into a bracket 19 extended from the front of the frame toward the upper portion thereof.

The downward throw of key lever 11' is limited by a stop 20 upon the frame front, and thus the key lever is restricted to movement between the stops 16 and 20, its downward movement being manually performed, and its upward or return movement resulting from the tension of spring 17. Obviously the tension of spring 17 can be regulated through adjustment screw 18.

Now it will be apparent that the degree of movement imparted to bars 15 in the throw of the key lever can be varied by setting the studs 16 of said bars into different opposed holes 14 of the yoke arms 12, the extent of such imparted movement increasing as the connection is made more distant from the key lever fulcrum at the pivots 13. Also the vertical movement of the movable racks is controlled through the same agency.

The carriage or support for a stack of articles or packages to be delivered is here shown as comprising a frame 21 having a top plate 22 that is disposed at a forwardly downward incline, the angle thereof being sufficiently steep to enable objects stacked thereon, when not restrained, to slide therefrom, under the influence of gravity. Normally the entire stack of articles or packages upon the carriage is confined within the frame and thereby restrained from delivery, with the exception of the uppermost article or package, which latter is held from delivery by other, releasable restraining means, to be described hereinafter.

Attached to the carriage frame 21 are lugs 23 which slidably engage vertical guides 24 upon frame 1, thereby permitting the carriage to be guided in its travel.

It has previously been stated that the carriage is releasably held to the racks by gripping mechanism, and this mechanism consists of pawls 24, 25, placed at opposite sides of a plate 26, forming part of the carriage frame, the pawls 24 being secured by bolts 27 at their lower ends to plates 26, and the pawls 25 being secured by bolts 28 at their upper ends to plates 26.

Springs 29 between plates 26 and pawls 24 hold said pawls extended away from said plates, and cause the barbs 30 of the pawls to engage a tooth 7 of the movable racks; and, similarly springs 31 between plates 26 and pawls 25 hold said pawls extended away from said plates and cause the barbs 32 of those pawls to engage a tooth 3 of the stationary racks.

The gripping mechanism just described is duplicated in the herein illustrated example of my invention in order that the carriage support may be equal at its opposite sides.

It will be observed that the carriage cannot move downwardly while springs 25 are extended, because the teeth 3 of the stationary racks co-act with the barbs 32 of the pawls 25 as positive stops that prevent such downward movement; but the teeth 3 of the stationary racks do permit upward movement to the carriage, because the barbs 32 will slip over said teeth 3 as the carriage is moved upwardly. Since it is necessary for the carriage to move upwardly to present a topmost article or package of the stack, supported on the carriage, for delivery thereof, in the operation of the mechanism, I provide suitable engagement between the barbs 30 of the pawls 24 and the movable racks 4, so that as said movable racks are given an upward motion, of predetermined extent, due to the operation of key lever 11', in consequence the carriage will be moved upwardly a corresponding extent.

When so moved the carriage will be supported in its new elevated position by reengagement of pawl barbs 32 in the adjacent teeth 3.

Instead of a single pawl 24 for each rack bar 4 and a single pawl 25 for each rack bar 2, I may pluralize these pawls, respectively, giving each an individual spring, and localizing their barbs for engagement with said bars respectively at points intermediate the distance between adjacent teeth 7 or 3. Thus, by way of example, I have shown the auxiliary pawls 24ª with springs 29ª and having barbs 30ª for engagement with the teeth of movable rack 4; and I have shown the auxiliary pawls 25ª with springs 31ª and having barbs 32ª for engagement with the teeth of rack 2.

While, in the operation of the delivery mechanism the barbs 32, 32ª will slip over the teeth 3 as the movable racks rise and by engagement of barbs 30 or 30ª carry the carriage with them, yet, with the pawls extended by their springs it is not possible to draw the carriage downwardly, as for reloading or for removal from the frame. Therefore I provide manually operable means for retracting the pawls against the tension of their springs, to thereby release said pawls from the rack bars 2 and 4, whereupon the carriage becomes freed and can either be lowered to a desired position within the frame or entirely withdrawn therefrom, for reloading or other purposes.

The means herein illustrated for thus retracting the pawls comprises a handle 33 that extends rearwardly from a transverse strip 34 to which the outer pawls 24ª are attached; also a handle 35 that extends rearwardly from a transverse strip 36 to which the outer pawls 25ª are attached, said handle 35 having a bail 37 in the path of movement of handle 33. Therefore when handle 33 is depressed handle 35 will also be depressed and the effect produced thereby is the release of the pawls from the racks.

From the explanation of my invention thus far given, it will be apparent that with each down stroke of the key lever the movable racks will be carried downwardly without disturbing the position of the carriage, because the teeth 7 of said racks, being up-pointed, will slip past the barbs 30; while the teeth 3 of the stationary racks will hold the barbs 32 or 32ª firmly lodged; also that upon the return or up-stroke of the key lever, as pulled by spring 17, the teeth 7 will grip barbs 30 or 30ª and thereby lift the carriage through a space corresponding to the extent of movement communicated to the racks 4 by the links 15.

The purpose in thus raising the carriage is to thereby bring the topmost article or package thereon into position for delivery from the apparatus, in which position the bottom surface of said topmost article or package is in a plane slightly above the upper, forward edge 38 of the frame. A guard 39 lies normally in front of this topmost article or package, to restrain it, so that delivery cannot occur until this guard is removed. The guard 39 has rearward arms 40, pivoted at 41 to the frame 1, said arms 40, near their forward ends, carrying studs 42 that work in slots 43 formed in links 44 that are pivoted to the yoke arms 12 of the key lever. Normally the studs lie in the lower parts of the slots 43, so that the links 44, in following the first part of the key lever movement exert no influence upon guard 39. But when the upper limit of slots 43 reach studs 42 during the key lever depressed movement, thereafter to the completion of the key lever down stroke guard 39 is moved downwardly out of the path of the article or package it had restrained, leaving said article or package free to slide out of the frame, thereby constituting delivery. A stop 39ª upon the frame serves to limit the downward movement of guard 39.

In addition to the guard 39 which may project upwardly in front of the topmost article or package only sufficiently to restrain its delivery until the key lever is depressed, I also provide a shield 45 to lie normally in front of said topmost article or package, covering the forward opening in a casing (not shown) through which abstraction of such article or package could otherwise be performed. The shield 45 is intended to lift the down movement of guard 39, for which purpose said shield has rearward arms 46, pivoted at 47 to frame 1, said arms 46 being connected to guard arms 40 by links 48, whose pivotal engagement with said links 48 occurs near to and rearwardly of pivots 47, as at 48ª. The result of this arrangement is that the relatively small downward motion of guard 39 causes a quick and wide lift to the shield 45. Springs 49 connecting arms 40 with the frame restore the guard and shield to their normal positions on the return of the key lever.

Pins 50 projecting from shield arms 46 lie against the rear edge of links 44, at the upper, rearwardly inclined portion 51 thereof, to in this manner lock both the shield and the guard from being moved to their open positions without operation of the key lever.

It is to be understood that the article or package release and delivery mechanisms herein described and illustrated are intended for use in conjunction with coin controlled mechanism for vending purposes, but coin controlled mechanism being examinable separately from delivery mechanism is excluded from this application.

Sometimes it is desirable to deliver from the apparatus single articles or packages from a plurality of stacks thereof arranged side by side upon the carriage top 22, and it is necessary therefore to provide means whereby the topmost article or package of one stack only will be presented for release when the key lever is actuated.

In carrying out this feature of my invention according to the example thereof herein represented in Fig. 9, I place an auxiliary top member over one-half the width of carriage top 22, said member having the form of a strip 52 with down turned flanges 53 at each end, the flanges having lugs 54 that engage in holes 55 provided in top 22 to thereby localize the member 52 at one side of said top 22. The height of member 52 should be one-half that of the articles or packages to be delivered, so that with each side by side pair of articles or packages the one upon member 52 will lie in a plane that is elevated above the plane of the companion article or package by an extent equalling half the thickness of one of said articles or packages.

Then by effecting a suitable adjustment of the movement that is communicated to the carriage by the movable rack, as communicated to it by links 15 from the key lever, this adjustment being performed by fitting the studs 16 in the appropriate holes 14 of the key lever arms 12, the guard 39 will be enabled to release single articles or packages alternately from the respective stacks upon the carriage.

Then, again, it may occur that articles or packages having greater length than that possessed by the carriage top 22 are required to be supported thereby and delivered therefrom, and this contingency is provided for by me in the following manner:

In Fig. 10 I have for example shown an auxiliary top member 56, whose length exceeds that of top 22, but is accommodated by placing it at a steeper angle thereon, the rear edge of member 56 resting against the rear wall 57 of top 22, and its forward edge having lugs 58 that engage in the holes 55 toward the front of top 22. The greater supporting length thus provided enables the longer articles or packages to be conveniently stacked for delivery upon the carriage without necessitating any enlargement of the frame 1 from front to rear.

For convenience in nomenclature in the claims the term "article" will be employed to designate the objects to be released and delivered from the apparatus, whether these objects be in the form of packages or otherwise.

Variations within the spirit and scope of my invention are equally comprehended by the foregoing disclosure.

I claim:

1. Delivery mechanism comprising containing means for a stack of articles, a vertically movable carriage for said stack, said carriage having a forwardly downward inclined top for the unconfined support of said stack and the gravity delivery of articles therefrom, forward guard means to restrain the topmost article, and means for moving said guard means to release said topmost article.

2. Delivery mechanism comprising containing means for a stack of articles, a vertically movable carriage, said carriage having a forwardly downward inclined top for the unconfined support of said stack and the gravity delivery of the articles therefrom, guard means to restrain the topmost article, and means for moving said guard means to release said topmost article.

3. Delivery mechanism comprising containing means for a stack of articles, a vertically movable carriage, said carriage having a forwardly downward inclined top for the unconfined support of said stack and the gravity delivery of the articles therefrom, means for moving said carriage a predetermined extent to free the topmost article from the containing means, guard means to restrain said topmost article when freed, and means coordinated with the carriage movement for moving said guard means to release said topmost article.

4. Delivery mechanism comprising containing means for a stack of articles, a vertically movable carriage, said carriage having a forwardly downward inclined top for the support of said stack, means for moving said carriage a predetermined extent to free the topmost article from the containing means, guard means to restrain said topmost article when freed, shield means to prevent abstraction of said article, and means coordinated with the carriage movement for moving both said guard and shield means to release said topmost article and permit its delivery.

5. Delivery mechanism comprising a frame, a carriage to support a stack of articles in said frame, rack means secured to said frame, other rack means slidable with relation to said frame, a key lever operably connected to said frame, means of engagement between said carriage and rack means which prevents movement of said carriage in opposite directions relatively to the respective rack means, means intermediate the slidable rack and key lever for communicating to the carriage the movement of said slidable rack in one direction, and means for regulating the extent of said communicated movement.

6. In delivery mechanism, in combination, a hollow vertical frame, a carriage movable therein, the top of said carriage being inclined forwardly downward for the gravity delivery of articles stacked thereon, means for elevating the carriage to present the topmost article above the upper forward edge of the frame, guard means to restrain delivery of said topmost article, and means for moving said guard means to release said topmost article.

7. In delivery mechanism, in combination, a hollow, vertical frame, a carriage movable therein, the top of said carriage being inclined forwardly downward for the gravity delivery of articles stacked thereon, means for elevating the carriage to present the topmost article above the upper forward edge of the frame, guard means to restrain delivery of said topmost article, shield means to prevent abstraction of said topmost article, and co-acting means for moving both said guard and shield means to release and clear the delivery path of said topmost article.

8. Delivery mechanism comprising a frame, a rack fixed thereon, a slidable rack, guide means therefor, a carriage, pawls having downwardly directed means of engagement respectively with said racks, springs to urge said pawls against their racks, manually depressible means for moving said slidable rack downwardly a predetermined distance, in which movement said rack slips past the pawl urged thereagainst, and spring means to return said slidable rack, in which latter movement said rack elevates said carriage.

9. In delivery mechanism, in combination, a vertical frame, a key lever fulcrumed thereto toward its lower portion, said key lever being manually depressible, spring return means for said key lever, a bar pivoted near the upper portion of said frame, a link connecting said key lever and bar, a slidable rack in pivotal engagement with said link, guide means therefor, a carriage, and means of engagement between said rack and carriage operable to elevate said carriage in the return movements of the key lever and rack.

10. In delivery mechanism, in combination, a vertical frame, a key lever fulcrumed thereto toward its lower portion, said key lever being manually depressible, spring return means for said key lever, a bar pivoted near the upper portion of said frame, a link connecting said key lever and bar, a slidable rack in pivotal engagement with said link, guide means therefor, a carriage, means of engagement between said rack and carriage operable to elevate said carriage in the return movements of the key lever and rack, and means of adjustment between said link and key lever to vary the extent of the movement communicated to said carriage through said link and rack.

11. In delivery mechanism, in combination, a vertical frame, a key lever fulcrumed thereto toward its lower portion, said key lever being manually depressible, spring return means for said key lever, a carriage movable in said frame to support a stack of articles and present a topmost article for delivery, a pivotal guard to lie normally in front of said topmost article to restrain its delivery, a vertical bar in pivotal engagement with said key lever, said bar having a slot, a stud upon said bar to engage said slot normally at the lower end thereof, the extent of said slot being so related to the key lever depressed movement that the upper end of the slot engages the stud in the latter part of that movement to thereby move the guard out of the path of said topmost article, to permit delivery of the latter, and a spring to restore said guard to its normal position.

12. In delivery mechanism, in combination, a vertical frame, a key lever fulcrumed thereto toward its lower portion, said key lever being manually depressible, spring return means for said key lever, a carriage movable in said frame to support a stack of articles and present a topmost article for delivery, a pivotal guard to lie normally in front of said topmost article to restrain its delivery, a vertical bar in pivotal engagement with said key lever, said bar having a slot, a stud upon said bar to engage said slot normally at the lower end thereof, the extent of said slot being so related to the key lever depressed movement that the upper end of the slot engages the stud in the latter part of that movement to thereby move the guard out of the path of said topmost article, to permit delivery of the latter, a pivotal shield to lie normally in front of the topmost article, above the guard, to prevent article abstraction, a link connecting the guard and shield, to prevent article abstraction, a link connecting the guard and shield and communicating a lift, article exposing movement to the shield in the depressed movement of the guard, and a spring to restore said guard and shield to their normal positions.

13. In delivery mechanism, in combination, a vertical frame, a key lever fulcrumed thereto toward its lower portion, said key lever being manually depressible, spring return means for said key lever, a carriage movable in said frame to support a stack of articles and present a topmost article for delivery, a pivotal guard to lie normally in front of said topmost article to restrain its delivery, a vertical bar in pivotal engagement with said key lever, said bar having a slot, a stud upon said bar to engage said slot normally at the lower end thereof, the extent of said slot being so related to the key lever depressed movement that the upper end of the slot engages the stud in the latter part of that movement to thereby move the guard out of the path of said topmost article, to permit delivery of the latter, a pivotal shield to lie normally in front of the topmost article, above the guard, to prevent article abstraction, a link connecting the guard and shield and communicating a lift, article exposing movement to the shield in the depressed movement of the guard, and means co-acting between said vertical bar and shield to lock the guard and shield against their opening movement until the vertical bar is moved downwardly.

14. The combination with delivery mechanism including a rectangular frame and a carriage movable therein, said carriage serving to support and elevate in stages a stack of articles, of an auxiliary top member having means of removable engagement with the carriage top, said auxiliary top member covering a side portion of the carriage top, to thereby provide a raised support for articles borne by the carriage at that side.

15. The combination with delivery mechanism including a rectangular frame and a carriage movable therein, said carriage serving to support and elevate in stages a stack of articles, of an auxiliary top member having means of removable engagement with the carriage top, said auxiliary top having greater length than the space from front to back of the frame, to support articles of greater length, and therefore being positioned at a suitable steep angle upon the carriage for the accommodation of said articles.

Executed this 17th day of August, 1926.

CHARLES J. PAULSON.